Aug. 23, 1960  E. CLERC  2,949,923
APPARATUS FOR DISTRIBUTING AND MIXING TWO FLUIDS
Filed Aug. 5, 1957  3 Sheets-Sheet 1
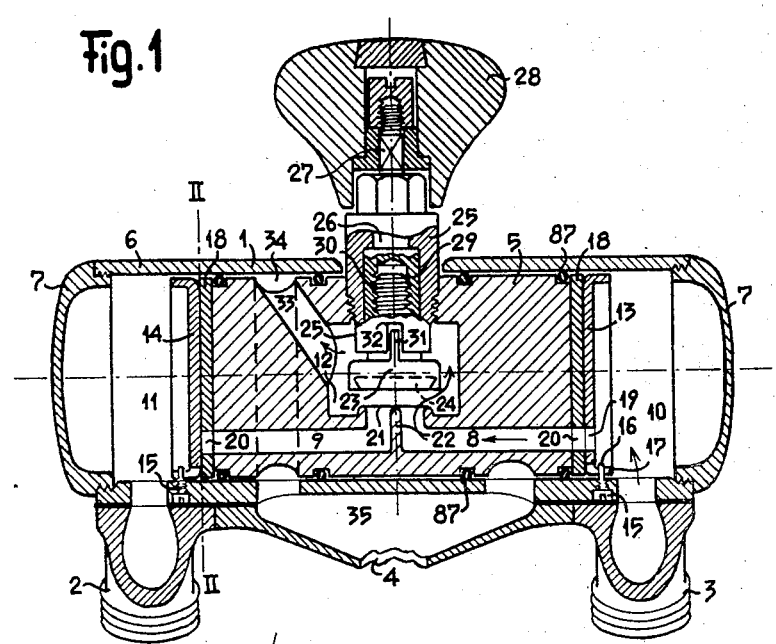
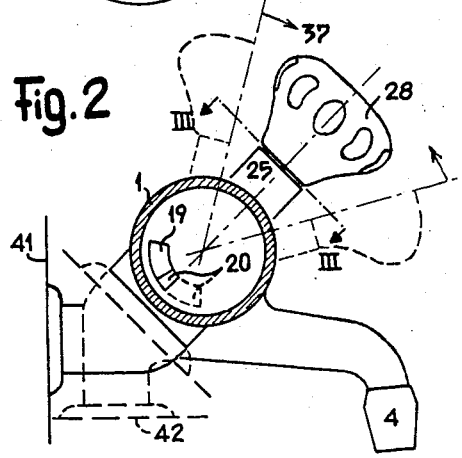
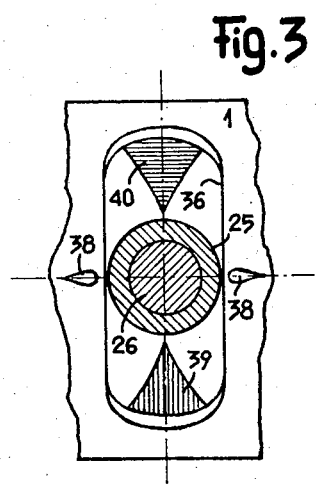
INVENTOR
EUGENE CLERC

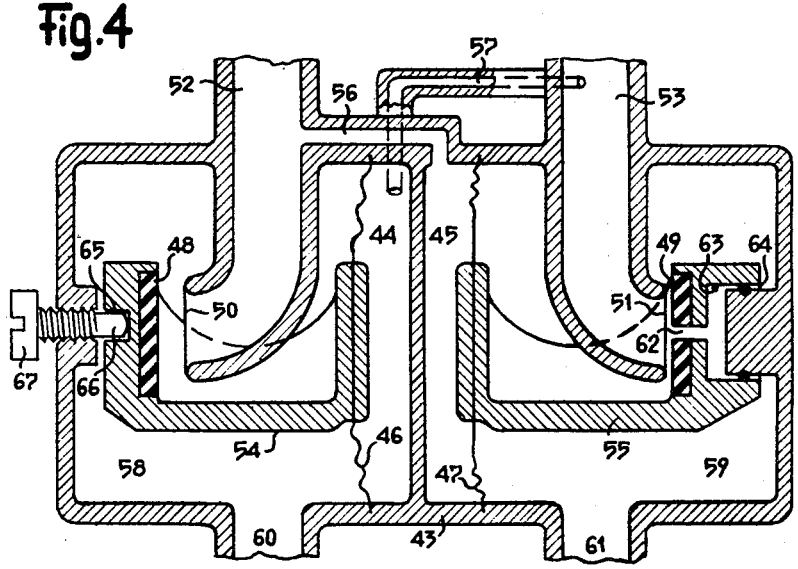
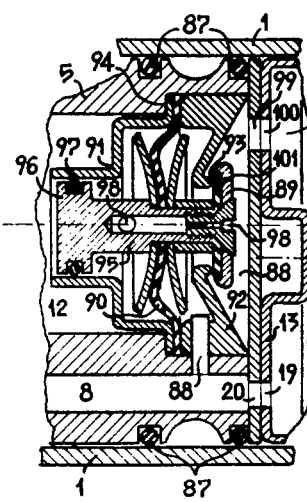
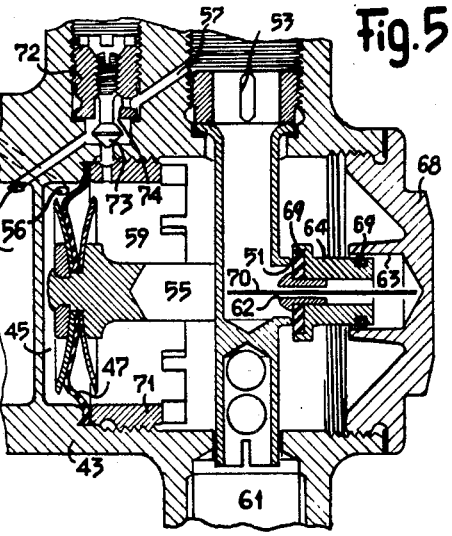

Aug. 23, 1960 E. CLERC 2,949,923
APPARATUS FOR DISTRIBUTING AND MIXING TWO FLUIDS
Filed Aug. 5, 1957 3 Sheets-Sheet 3

INVENTOR
EUGENE CLERC
BY Emory L. Groff
ATTY

United States Patent Office 2,949,923
Patented Aug. 23, 1960

2,949,923
APPARATUS FOR DISTRIBUTING AND MIXING TWO FLUIDS

Eugene Clerc, 16 Avenue Sainte-Clotilde, Geneva, Switzerland

Filed Aug. 5, 1957, Ser. No. 676,092

Claims priority, application Switzerland Feb. 2, 1957

10 Claims. (Cl. 137—98)

My invention has for its object an apparatus for distributing and mixing two fluids, comprising a main hollow member provided with an inlet pipe for each of the two fluids, an outlet nozzle for the mixture of fluids, a control member for adjusting the flow through the outlet nozzle, said apparatus incorporating furthermore two openings defining the flow of the two corresponding fluids, said openings, the cross-sectional areas of which vary in opposite directions, feeding the fluids through corresponding channels into a mixing chamber while means are provided for adjusting these cross-sectional areas so as to obtain a mixture of said fluids in all desired proportions.

My invention has more particularly for its object an improved distributing and mixing apparatus for two fluids, wherein the same control member providing for the adjustment of the total throughput provides also for the adjustment of the relative cross-section areas of the variable openings in accordance with the proportions to be obtained for the two fluids in the mixture.

The apparatus according to my invention has consequently for its advantage a simplified operation since a single member is to be handled for adjusting either the throughput or the desired proportion between the two fluids.

I have illustrated by way of example in accompanying diagrammatic drawings various embodiments of my improved mixing apparatus. In said drawings:

Fig. 1 is a longitudinal sectional view of a first embodiment.

Fig. 2 is a side view partly sectional through line II—II of Fig. 1.

Fig. 3 is an outer partly sectional view of the same apparatus through line III—III of Fig. 2.

Fig. 4 is a diagrammatic showing of an arrangement for equalizing the pressures prevailing inside the two fluids before their admixture.

Fig. 5 is a partly sectional view of a structural modification of the arrangement according to Fig. 4.

Fig. 10 is a view of a portion of Fig. 6 on an enlarged scale.

Figure 6:
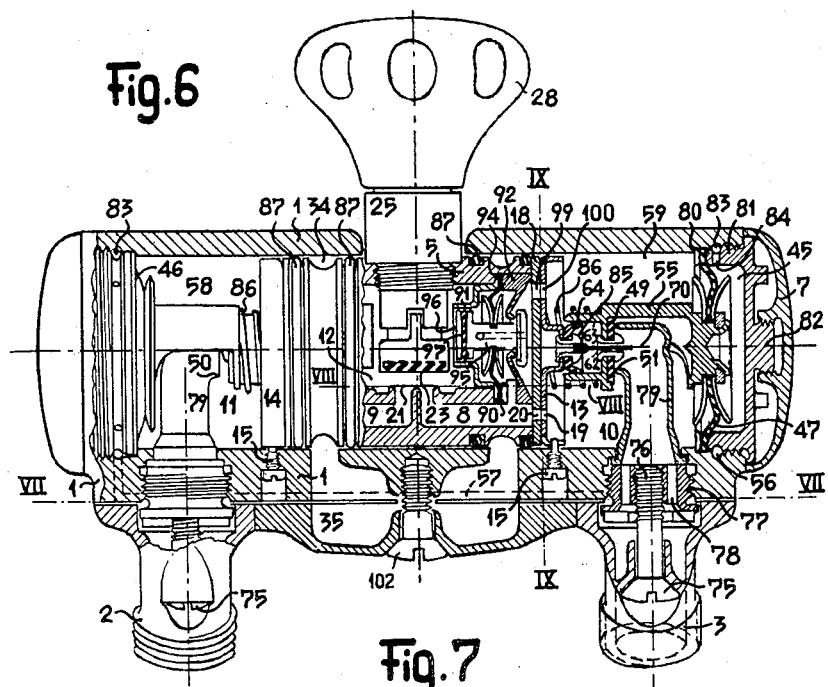
Fig. 6 is an axial sectional view of a second embodiment of my improved apparatus.
Figure 7:
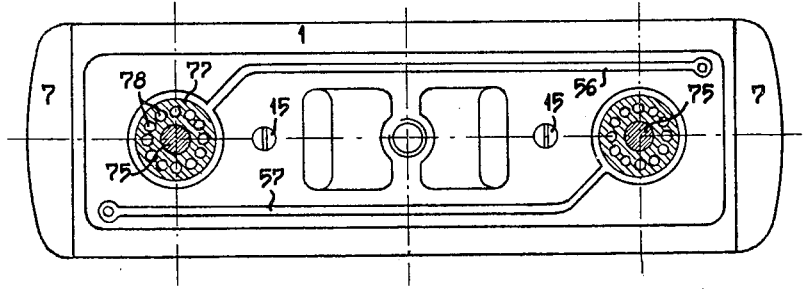
Fig. 7 is a sectional view of last mentioned apparatus through line VII—VII of Fig. 6.
Figure 8:
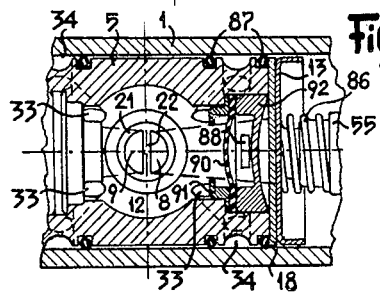
Fig. 8 is a partial sectional view through line VIII—VIII of Fig. 6.
Figure 9:
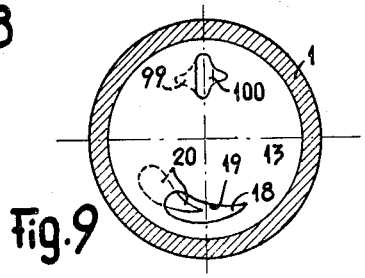
Fig. 9 is a cross-section through line IX—IX of Fig. 6.

Said apparatus for distributing and mixing two fluids such as two different gasiform fluids, two different liquids or two identical liquids at different temperatures includes as shown in Figs. 1 to 3 a main hollow body 1 provided with two inlet pipes 2 and 3 for the two fluids to be mixed; said main hollow body is further provided with a nozzle 4 for the outlet of the mixed fluids.

Inside the main hollow body 1 which is of a cylindrical shape is arranged a cylindrical plug 5 adapted to be angularly shifted inside the body 1.

It is apparent from inspection of Fig. 1 that the hollow body 1 includes a central cylindrical section 6 closed at each end by a cover 7 screwed into the corresponding end of the section 6. As to the inlet pipes 2 and 3 and to the outlet nozzle 4, they are formed on members fitted in the outer wall of the cylindrical section 6. The inner plug 5 is provided inwardly with channels 8 and 9 which connect the receiving chambers 10 and 11 extending beyond each end of the inner plug 5 with a central mixing chamber 12 formed inside the latter to assure mixing of the two fluids.

Openings of an adjustable cross-sectional area varying in opposite directions are formed at the ends of the main body 1. To this end, discs 13 and 14 having marginal flanges are arranged transversely across the bore in the body 1 and they are angularly rigid with the latter, as provided by the threaded studs 15 the tips 16 of which engage slots extending longitudinally of the body 1 at the periphery of said discs. These discs 13 and 14 may thus be slightly shifted in an axial direction but they are urged against the plates 18 secured to the corresponding outer ends of the inner plug 5 by the pressure of the fluid inside the terminal receiving chambers 10 and 11.

Each disc 13 or 14 is provided with an arcuate opening 19 the shape of which matches advantageously that of an opening 20 at the corresponding end of the plug 5, i.e. inside the corresponding plate 18 rigid with the latter, said openings communicating with the channel 8 or 9 according to the case. The openings 19 provided in the discs 13 and 14 are angularly shifted with reference to each other so that when the opening 19 in the flange 13 registers exactly with the opening 20 communicating with the channel 8 for a predetermined angular setting of the plug 5, the other opening 20 communicating with the channel 9 is closed by a solid section of the flange 14.

These openings 19 and 20 at either end of the plug form thus together passageways the cross-sectional areas of which vary in opposite directions. Thus, it is possible to bring the plug 5 into a predetermined angular position so as to obtain the desired proportion for the mixture of the two fluids passing through said passageways.

The channels 8 and 9 open into the mixing chamber 12 through a common opening 21 provided with a transverse partition 22. This common opening 21 constitutes a seat for a single closing member 23 provided with a fluidtight packing 24. Said closing member 23 is guided inside a member 25 which is screwed radially into the central section of the plug 5. Said member 25 carries revolubly a spindle 26 to the end of which 27 is secured a control knob 28 providing for the rotary drive of the spindle 26. Said spindle 26 is rigid with a tapped section 29 into which is screwed a threaded section 30 of the closing member 23. The latter is provided furthermore with an eccentric stud 31 guided inside a notch 32 of the member 25 which prevents any angular movement of the closing member 23. Any rotary movement of the control knob 28 in either direction produces thus an axial movement of the closing member 23 towards or away from the seat 21 according as to whether it is desired to reduce or to increase the flow of fluid through the outlet 4. As a matter of fact, the fluids mixed inside the mixing chamber 12 pass out of the latter through a channel 33 and hence, through the annular groove 34, they enter the collecting chamber 35 located ahead of the nozzle 4.

It should be remarked that fluidtight packings 87 are fitted between the plug 5 and the surface of the bore in the body 1 so as to ensure the desired fluidtightness inside the apparatus.

The main body 1 is provided in its central section 6 with an arcuate elongated slot 36 through which passes the knob carrying member 25. This slot 36 has a size sufficient for allowing angular movements of the control knob 28 over the arc 37 illustrated in Fig. 2. The angular positions of the openings 19—20 with reference to the member 25 are such that when said member 25 engages one end of the arcuate slot 36, one of the said openings having a variable cross-section 19—20 is completely open while the other is completely closed.

Thus, when the control knob 28 is shifted in a manner such that the member 25 is located in registry with the middle of the arcuate slot 36 as shown by the reference mark 38, the passages of an adjustable cross-section 19—20 located at the corresponding ends of the plug 5 have equal cross-sectional areas, which produces a mixture containing 50% of each of the fluids entering the inlet pipes 2 and 3 respectively.

It will be readily understood that the mixture of the two fluids entering through the inlets 2 and 3 may be obtained in any desired proportions through a suitable selection of the corresponding angular position of the control knob 28 with reference to the elongated slot 36. Reference marks may be provided either on the plug 5 or on the body 1 so as to show the proportion of the mixture corresponding to each angular position of the control knob 28 with reference to the slot 36.

In an embodiment illustrated in Fig. 3, reference marks of a generally triangular shape which may be for instance of different colors 39 and 40, are shown on the outer wall of the plug 5. These triangular reference marks appear in different sizes to the observer, according to the angular setting given to the plug 5 with reference to the body 1, since a section of either of said reference marks 39 and 40 may be concealed by the body 1. Thus, more the apparent size of one of the reference marks 39 and 40 is larger when seen through the slot 36 and more the proportion of fluid corresponding thereto, for instance of hot water, is high in the mixture passing through the outlet nozzle 4.

Fig. 2 shows that the inlet pipes 2 and 3 are provided on members the shapes of which allow securing the apparatus either to a vertical wall 41 or to a horizontal carrier 42, constituted for instance by the upper surface of the rear end of a wash-basin. It is sufficient as a matter of fact to shift through 180° the parts incorporating the inlet pipes 2 and 3 with reference to the body 1 so as to obtain either of said alternative fitting positions illustrated in full and in interrupted lines in Fig. 2.

The operation of an apparatus of the type described hereinabove with reference to Figs. 1 to 3 is as follows:

When no output of fluid through the nozzle 4 is desired the control knob 28 is turned clockwise so as to provide for the engagement between the closing member 23 and the seat 21. When it is desired to produce a mixture of the two fluids, arriving through the inlet pipes 2 and 3 in the desired proportions, the plug 5 is shifted angularly with reference to the body 1 through a corresponding shifting of said control knob 28, so as to obtain the mixture in the desired proportion. It is then sufficient to release the control knob 28 axially so as to shift the closing member 23 away from its seat 21 and to allow thus a mixing of the two fluids arriving through the channels 8 and 9 into the chamber 12; the mixture will then pass out of the nozzle 4 in amounts corresponding to the extent of opening of the closing member 23 with reference to its seat 21. It should be remarked that the selection of a predetermined proportion of the mixture of the two fluids and also the selection of the output through the nozzle 4 may be controlled simultaneously through operation of the control knob 28 through its shifting in both manners described.

The apparatus described with reference to Figs. 1 to 3 operates in a perfectly reliable and uniform manner as long as the fluids arriving through the inlets 2 and 3 are subjected to pressures which are equal to each other or differ slightly from each other. However, when large differences in pressure exist between the two liquids, the proportions of the fluids in the mixture as defined by the angular position of the plug 5 with reference to the body 1 are no longer perfectly accurate. In this case it is of interest to associate with the apparatus an arrangement for equalizing the pressures prevailing in the two fluids before they reach the mixing chamber 12. Such an arrangement has been illustrated diagrammatically in Fig. 4. It includes a casing 43 inside which are formed two compartments 44 and 45, at least one wall in each of which is shiftable under the action of the modifications in pressure prevailing in the compartments 44 and 45.

In the example illustrated, the shiftable wall in each compartment is constituted by a diaphragm 46 and 47, respectively. Each diaphragm 46 and 47, is rigid with a member 48 and 49, controlling the opening 50 and 51, through which the corresponding fluid is fed. As a matter of fact, the supply for one of the fluids to be mixed together is connected with a channel 52 while the supply for the other fluid is connected with a channel 53 and these two channels 52 and 53 open into the casing 43 through said passages or openings 50 and 51.

As apparent upon inspection of said Fig. 4, each control member 48 or 49 is constituted by a valve carried by a strap 54, respectively 55, secured to the central section of the corresponding diaphragm 46 or 47. A shunt channel 56 connects the compartment 45 with the channel 52 and similarly a shunt channel 57 connects the compartment 44 with the channel 53. The fluid passing out of the openings 50 and 51 enters a chamber 58 and fluid passing out of 51 enters the chamber 59. The said chambers 58 and 59 respectively discharge through the channels 60 and 61 to the inlet pipe 2 or 3 of the apparatus illustrated in Fig. 1. The control valve 49 is always subjected to a closing force which is slightly higher than the opening force produced by the fluid pressure operating inside the corresponding channel 53. To this end, said valve 49 is provided with a passageway 62 which allows the fluid arriving through the channel 53 to act inside the cylinder 63 the cross-sectional area of which is larger than the cross-section of the opening 51 closed by the valve 49.

As shown in Fig. 4, the cylinder 63 is formed in an extension of the strap 55 and it slides over a stationary piston 64 raised over the inner wall of the casing 43. As to the other strap 54, it is provided with a blind recess 65 inside which may enter the tip 66 of a screw 67 which provides for adjustment of the spacing of the valve 48 with reference to the seat formed round the opening 50 of the channel 52, said screw 67 providing if desired for the complete covering of said opening 50.

The operation of the pressure equalizing means illustrated in Fig. 4 is as follows:

Assuming the pressure prevailing in the channel 52 is higher than the pressure prevailing in the channel 53, said pressure in the channel 52 acts inside the compartment 45 and produces a shifting of the wall 47 and thereby of the control valve 49 towards the right hand side of Fig. 4 against the lower pressure prevailing in the chamber 59 communicating with the channel 53. This uncovers the opening 51 by an amount which is all the higher when the difference in pressure between the two fluids is larger. This uncovering leads automatically to an increase of the throughput passing out of the opening 51 into the channel 61, so as to compensate for the higher pressure of the flow passing out of the opening 50 which latter opens only to a slight extent since the compartment 44 is subjected to the reduced pressure prevailing in the channel 53. This arrangement allows thus making sure that the throughput of the two fluids passing out of the channels 60 and 61 may be substantially equal in spite of the different pressures of said fluids as originally supplied.

Fig. 5 illustrates a structural embodiment of the pressure equalizing means illustrated diagrammatically in Fig. 4. The different parts of the embodiment acting in a manner similar to equivalent parts illustrated in Fig. 4 carry the same reference numbers. In Fig. 5, the cylinder 63 is shown no longer as formed in the strap-shaped member 55, but in the central projecting section of the cover 68 of the casing 43 and threadedly engaging said casing. In contradistinction, the piston 64 is formed on the strap-shaped member 55 and a fluid tight packing 69 is inserted between the piston 64 and the cylinder 63. Furthermore, a needle 70 extends inside the channel 62 so as to prevent any clogging of the latter through scale or the like deposits. The diaphragm 47 is secured inside the casing 43 through the agency of a castellated threaded nut-shaped member 71.

Furthermore, there is provided an auxiliary three-way valve 72 in the channel 57 to provide for connection either directly between the compartment 44 and the channel 53 as illustrated in Fig. 5 or else, upon application of the needle valve 73 against its seat 74, between the compartment 44 and the chamber 59 which is subjected to a lower pressure than the channel 53. For this latter position, the valves 48 and 49 have a tendency to move towards their positions closing the openings 50 and 51 respectively. The three-way valve 72 is of particular interest when it is desired to replace the fluidtight packing 24 of the closing member 23 since this may be obtained without it being necessary to close the channels 52 and 53 ahead of the pressure equalizing means.

The embodiment illustrated in Figs. 6 to 10 shows an apparatus of the same type as that illustrated in Fig. 1 with the incorporation of a pressure equalizing arrangement similar to that illustrated in Fig. 5. The same reference numbers have been retained for the parts operating in a manner similar to the corresponding parts in Figs. 1 and 5.

As illustrated in said Fig. 6, the inlet pipes 2 and 3 are fitted on the cylindrical body 1 through the screws 75 screwed inside each inlet and the threaded shanks 76 of which engage the central sections of connections 77 screwed in their turn inside the body 1. Each connection 77 is provided with a series of longitudinal passageways 78. The opening 50 or 51 is provided at the end of a bent tube 79 fitted between the body 1 and the connection 77. The diaphragms 46 and 47 are each secured inside the corresponding end of the body 1 between a shoulder 80 on the latter and an inner cover 81 screwed into the corresponding end of the body 1. The outer covers 7 are screwed each over the central outwardly projecting section 82 of the corresponding inner cover 81. Channels 56 and 57 are provided in the lower section of the body 1 (Fig. 7) and each communicates with a groove 83 provided at the periphery of the threaded section of the cover 81. Said groove 83 communicates in its turn with the corresponding compartment 44 or 45 through the radial connections 84. As to the piston 64, it is formed by a cup-shaped packing 85 fitted in the central section of the flange 13. Said flange 13 also carries the deposit removing needle 70 extending through the opening 62 in the valve 49. The cylinder 63 is thus constituted on an extension of the strap-shaped member 55 as in the case of Fig. 4. Furthermore, a spring 86 fitted between the flange 13 and the strap-shaped member 55 urges the valve 49 against its seat 51. As in the case of the embodiment illustrated in Fig. 1, fluidtight annular packings 87 are provided between the plug 5 and the inner wall of the body 1.

The operation of the pressure equalizing means incorporated with the apparatus illustrated in Fig. 6 is altogether similar to that referred to in the description of Figs. 4 and 5.

The apparatus illustrated in Fig. 6 includes furthermore an arrangement for correcting the throughput of fluid through the openings 19—20 of a variable cross-sectional area.

Each of said correcting means includes a by-pass 88 (Fig. 10) between the input 2, and channel 9 for one of the fluids and between the input 3 and the channel 8 for the other fluid feeding the fluid from an opening having a variable cross-section 19—20 towards the mixing chamber 12. Said by-pass 88 is controlled by a valve 89 subjected to the pressure of the fluid and opening the passage for the fluid through said by-pass 88 to an extent which is all the greater when the loss of head produced by the passage of the fluid through the corresponding opening 19—20 is higher.

As shown in Figs. 6 and 10, a diaphragm 90 is secured inside the plug 5 between a tubular member 91 and a member 92 the central section of which forms the seat 93 for the valve 89. These parts 90, 91, 92 are clamped between a shoulder 94 on the plug 5 and the corresponding plate 18. The stem 95 of the valve 89 is fitted in the central section of the diaphragm 90 and extends towards the left hand side thereof as shown in Fig. 6 in the shape of a piston 96 provided with a fluidtight packing 97 and sliding inside the tubular member 91. Furthermore, said valve 89 is provided with a central channel 98 connecting the space to the left hand side of the diaphragm 90 with the free space ahead of the valve 89. Furthermore, ports 99 and 100 are provided in registry inside the plate 18 and the flange 13 extending over the latter to connect 88 and 59.

The operation of the flow-correcting means which have been just described is as follows:

When the closing member 23 is spaced to only a small extent with reference to its seat 21 and the throughput of the mixture passing out of the nozzle 4 is small, the loss of head produced by the passage of each fluid through the openings 19—20 having a variable cross-sectional area is very small and the valve 89 retains the position illustrated in Figs. 6 and 10; in other words, the fluidtight packing 101 provided on said valve 89 remains in contact with the seat 93. Thus no fluid can flow through the by-pass 88. In contradistinction, when the closing member 23 allows a higher throughput of the fluid mixture through the output nozzle 4, the loss of head through each opening 19—20 having a variable cross-section becomes larger and this results in that the fluid contained in the terminal chamber 10 of Fig. 1 or in the chamber 59 of Fig. 4 is subjected to a higher pressure than the fluid contained in the corresponding channel 8. The pressure prevailing in the chamber 59 is transmitted through the ports 99 and 100 and the channel 98 into the space located to the left hand side of the diaphragm 90. This produces a shifting towards the right hand side of said diaphragm i.e. towards the right hand side of Fig. 6 and consequently an opening of the valve 89 which allows a certain fraction of the fluid to flow through the by-pass 88 towards the channel 8. Thus, in this position, the ports 99 and 100 cooperating with the by-pass 88 allow a certain amount of fluid to flow shuntwise towards the mixing chamber 12 so as to compensate at least partly for the loss of head produced in the opening 19—20 having a variable cross-section.

In the case where the closing member 23 is at a maximum distance from its seat 21 and allows a maximum throughput, it may occur that the output nozzle 4 is not sufficient for this maximum throughput to be possible under the prevailing conditions and this leads to an increase in the pressure existing in the mixing chamber 12. In this case, said increase in pressure in the chamber 12 acts on the piston 96 of the correcting means and shifts it towards the right hand side of Fig. 10 so as to open still further the valve 89. Thus a still larger compensation for the loss of head to which each fluid is subjected during its passage through the apparatus is obtained and this results in a proportional increase in the throughput of the mixed fluids passing out through the nozzle 4.

As shown in Fig. 6, the mounting and dismantling of the apparatus, for instance during an overhauling, are made easy since the collecting chamber 35 may be readily separated from the body 1 through an unscrewing of a screw 102 engaging the central section of said body 1. On the other hand, the removal of the inlet pipes 2 and 3 through unscrewing of the screws 75 allows an easy access to the connections 77 whereby it is possible to release the bent pipes 79. The associated covers 7 and 81 allow a speedy dismantling both of the pressure equalizing means and of the means correcting the flow by means of the valve 89.

Numerous modifications of the apparatus described may be imagined. Thus, the diaphragms 46 and 47 and also the diaphragms 90 may be replaced by other types of shiftable walls such for instance as pistons sliding inside corresponding cylinders. Said diaphragms may also be replaced by walls of chambers of the aneroid chamber type.

Obviously, the apparatus described with reference to Figs. 6 to 10 may also be executed without the throughput correcting means and include in addition to the embodiment illustrated in Fig. 1 only the pressure equalizing means. Conversely, it is possible to design an apparatus similar to that illustrated in Fig. 1 with the mere incorporation of the correcting means illustrated in Fig. 10.

As mentioned hereinabove, a pressure equalizing system of the type illustrated in Figs. 4 and 5 may be fitted ahead of the inlet pipes 2 and 3 of the apparatus illustrated in Fig. 1. Said system including pressure equalizing means independent of the actual distributing apparatus would operate in fact in the same manner as the compound apparatus illustrated in Fig. 6.

I claim:

1. An apparatus for mixing two fluids and distributing the mixture, comprising a hollow cylindrical body, a plug revolubly carried inside said body and provided with an inner mixing chamber, with output means for said mixing chamber and with two passageways opening at one end in side by side relationship into said mixing chamber, a plate rigid with each end of the plug and provided with an arcuate slot coaxial with the plug and opening into the outer end of the corresponding passageway, a flange rigid with the main body in a contacting relationship with each plug plate and provided with an arcuate slot coaxial with the plug and having the same radius as the slot in the corresponding plate, the rotation of the plug providing for a registering of the slots in the plate and flange systems over an arcuate length depending on the angular setting of the plug and the surfaces of the cross-sectional areas of the registering slot sections connecting the plug passageways with the input means varying by equal amounts in opposite directions upon rocking of the plug inside the body, input means for feeding each fluid into the ends of the hollow body in registry with the passageway portions passing through the corresponding outer ends of the plug, an output nozzle communicating with the output means in the plug throughout the angular movements of the latter, a closing member adapted to close simultaneously the openings of the two passageways into the mixing chamber, and a common member controlling the angular position of the plug in the body and the position of the closing member with reference to the first mentioned passageways to adjust the total throughput of fluid out of the mixing chamber and through the output nozzle.

2. An apparatus for mixing two fluids and distributing the mixture, comprising a hollow cylindrical body provided with a transverse slot, a plug revolubly carried inside said body and provided with an inner mixing chamber, with two passageways opening in side by side relationship into said mixing chamber and with a peripheral groove connected with said mixing chamber, input means for feeding a fluid into each end of the hollow body into registry with the corresponding outer end of the plug, an output nozzle communicating through the wall of the cylindrical body with the peripheral groove in the plug, a closing member adapted to close simultaneously the openings of the two passageways into the mixing chamber, further passageways each extending through one end of the plug and connecting one of the first mentioned passageways inside the plug with the corresponding end of the hollow body communicating with the input means, the surfaces of the cross-sectional areas of said further passageways at both ends of the plug varying in opposite directions upon angular movement of the plug round its axis, a radial sleeve-shaped projection on the plug facing the transverse slot in the hollow body, a threaded member controlling the closing member and extending longitudinally inside said projection, a further threaded member revolubly carried inside the projection, engaging the first threaded member and extending through the slot in the hollow body, means holding the first threaded member against rotation, a control member rigid with the second threaded member on the outside of the hollow body, said control member being adapted when revolving to shift the first threaded member longitudinally of the projection and thereby urge the closing member towards and away from the cooperating openings of the passageways into the mixing chamber, and when moved bodily with the threaded members and projection along the slot in the hollow body to angularly shift the plug and thereby make the surfaces of the cross-sectional areas of the further passageways vary in opposite directions.

3. An apparatus for mixing two fluids and distributing the mixture, comprising a hollow cylindrical body provided with a transverse slot, a plug revolubly carried inside said body and provided with an inner mixing chamber, with two passageways opening in side by side relationship into said mixing chamber and with a peripheral groove connected with said mixing chamber, input means for feeding a fluid into each end of the hollow body into registry with the corresponding outer end of the plug, an output nozzle communicating through the wall of the cylindrical body with the peripheral groove in the plug, a closing member adapted to close simultaneously the openings of the two passageways into the mixing chamber, means connecting the ends of the passageways in the plug with the outer ends of the hollow body through slots the cross-sectional areas of which vary with the angular setting of the plug by equal and opposite amounts, a radial sleeve-shaped projection on the plug facing the transverse slot in the hollow body, a threaded member controlling the closing member and extending longitudinally inside said projection, a further threaded member revolubly carried inside the projection engaging the first threaded member and extending through the slot in the hollow body, means holding the first threaded member against rotation, a control member rigid with the second threaded member on the outside of the hollow body, said control member being adapted when revolving to shift the first threaded member longitudinally of the projection and thereby urge the closing member towards and away from the cooperating openings of the passageways into the mixing chamber, and when moved bodily with the threaded members and projection along the slot in the hollow body to angularly shift the plug and thereby make the surfaces of the cross-sectional areas of the slots vary by equal and opposite amounts.

4. An apparatus for mixing and distributing two fluids, comprising two fluid input pipes, a main hollow body provided with an inner mixing chamber, with an output nozzle through which the mixture of fluids passes out of the main body, with means connecting the nozzle with the mixing chamber and with passageways of adjustable cross-sectional areas connecting the input pipes for each fluid with the mixing chamber, means controlling simultaneously the cross-sectional areas of said passageways to make the surfaces of said areas vary in opposite directions, means controlling the total throughput of the mixture of fluids passing through the mixing chamber into the outlet nozzle, a common control member for both last mentioned controlling means, and means for hydraulically and automatically equalizing the fluid pressure to the mixing chamber, said means including a valve inserted in each input pipe, one of said valves being provided with a transverse perforation, a member rigidly connected with each valve and subjected to the difference in pressure between the two fluids before the valves, the member connected with the valve in the pipe subjected to the higher pressure being adapted to urge last mentioned valve into its closed position, and a piston and cylinder system the components of which are respectively stationary and rigid with the perforated valve, said cylinder forming in front of its piston a chamber opening into the perforation of the valve and the diameter of which is larger than the operative area of said valve to produce a closing force which is larger than that exerted by the fluid on the valve.

5. An apparatus for mixing and distributing two fluids, comprising two fluid input pipes, a main hollow body provided with an inner mixing chamber, with an output nozzle through which the mixture of fluid passes out of the main body, with means connecting the nozzle with the mixing chamber and with passageways of adjustable cross-sectional areas connecting the input pipes for each fluid with the mixing chamber, means controlling simultaneously the cross-sectional areas of said passageways to make the surfaces of said areas vary in opposite directions, means controlling the total throughput of the mixture of fluids passing through the mixing chamber into the outlet nozzle, a common control member for both last mentioned controlling means, and means for hydraulically and automatically equalizing the fluid pressure to the mixing chamber, said means including means tapping off a fraction of the fluid feeding each input pipe, a compartment fed by each of last mentioned means, a diaphragm fitted in the wall of each compartment adapted to be shifted by the modifications in fluid pressure prevailing in said compartment, a control valve rigid with each diaphragm section and controlling the passage of the fluid towards the other input pipe to throttle the input of that fluid which is subjected to a higher pressure by the pressure of the fluid subjected to a lower pressure, a by-pass channel connecting each input pipe with the mixing chamber, a valve controlling each by-pass channel and deformable diaphragms subjected to the difference in fluid pressure between the corresponding upstream and downstream sides of each passageway and controlling each the valve in the corresponding by-pass channel to open same in accordance with the loss of head in said passageway.

6. An apparatus for mixing and distributing two fluids, comprising two fluid input pipes, a main hollow body provided with an inner mixing chamber, with an output nozzle through which the mixture of fluid passes out of the main body, with means connecting the nozzle with the mixing chamber and with passageways of adjustable cross-sectional areas connecting the input pipes for each fluid with the mixing chamber, means controlling simultaneously the cross-sectional areas of said passageways to make the surfaces of said areas vary in opposite directions, means controlling the total throughput of the mixture of fluids passing through the mixing chamber into the outlet nozzle, a common control member for both last mentioned controlling means, and means for hydraulically and automatically equalizing the fluid pressure to the mixing chamber, said means including means tapping off a fraction of the fluid feeding each input pipe, a compartment fed by each of last mentioned means, and a section of the wall of which is adapted to be shifted by the modifications in fluid pressure prevailing in said compartment, a control valve rigid with each shiftable wall section and controlling the passage of the fluid towards the other input pipe to throttle the input of that fluid which is subjected to a higher pressure by the pressure of the fluid subjected to a lower pressure, a three-way valve in at least one of the tapping off means adapted to connect the corresponding compartment with the input pipe associated with the tapping means, selectively at points respectively on the upstream and on the downstream side of the valve controlling the passage of fluid towards the input pipe.

7. An apparatus for selectively mixing and dispensing two fluids, comprising, a tubular body having an internal bore and a medial arcuate slot, removable covers closing the opposite ends of said body, axially movable discs having ports and secured against angular movement within the body and cooperating with the covers to provide fluidtight receiving chambers, inlet pipes disposed radially of the axis of the body and communicating with said receiving chambers, an outlet nozzle on the body between the inlet pipes, and plug means concealed within the body and movable about its axis, said plug means including, longitudinal passages for variable communication at one end with the ports of the discs and at the other end with a mixing chamber establishing communication between the ported discs and the outlet nozzle, an inlet valve seat in the mixing chamber and disposed across the said passages at their entrance to the mixing chamber, a control knob and spindle disposed radially of the plug and shiftable in said slot to control flow between said passages and said mixing chamber, said knob and spindle also rotatable about its own axis, and a closing member carried by the inner end of said spindle for movement toward and from said valve seat to control said passages when said knob is rotated about its axis.

8. An apparatus according to claim 7, wherein, the ported discs each have flanges engaging the bore of the tubular body, said flanges provided with a slot, and radial keys on the bore fitting within the slots to prevent angular movement of the discs but to enable them to move relative to the axis of the plug under fluid pressure within said inlet chambers.

9. An apparatus according to claim 7, wherein the receiving chambers communicate with pressure equalizing means for each fluid before it reaches the mixing chamber, said means including, valve means for throttling flow to each of the receiving chambers, and pressure responsive means in piped communication at one side thereof with the supply of the other fluid upstream of the receiving and mixing chambers to automatically control said valve means.

10. An apparatus for selectively mixing and dispensing two fluids, comprising, a tubular body having an internal bore and a transverse arcuate slot, a plug concealed within the said internal bore and having a mixing chamber provided with an outlet passage and further provided with a valve seat communicating with the outlet ends of longitudinal passages whose inlet ends open at the opposite end faces of the plug, discs in the bore locked against angular movement and free to move longitudinally of their axes against said opposite faces of the plug under fluid pressure to insure fluidtight contact therewith and to compensate for wear, said discs having ports for variable registry with the inlet ends of said passages, removable covers at opposite ends of the tubular body providing access for assembling the discs and to define inlet chambers communicating with said ported discs and having radial inlet connections, means on the tubular body providing an outlet chamber communicating with the outlet passage of the mixing chamber, a combined control knob and spindle connected with the plug through the arcuate slot for turning the plug to control flow between said inlet ends of the passages and said mixing chamber, said knob and spindle also rotatable about their own axes and having a valve at the inner end of the spindle for movement toward and from said valve seat to control the inlet ends of said passages when said knob is rotated.

References Cited in the file of this patent

UNITED STATES PATENTS

| | | |
|---|---|---|
| 353,704 | Nash | Dec. 7, 1886 |
| 1,313,105 | Morgan | Aug. 12, 1919 |
| 2,277,314 | Gallagher | Mar. 24, 1942 |
| 2,417,158 | Fraser | Mar. 11, 1947 |
| 2,571,734 | Lindabury | Oct. 16, 1951 |
| 2,650,604 | Barnett | Sept. 1, 1953 |

FOREIGN PATENTS

| | | |
|---|---|---|
| 522,578 | Italy | Apr. 8, 1955 |